G. B. HARLESTON.
LINE HOLDER.
APPLICATION FILED FEB. 21, 1912.
1,024,333.
Patented Apr. 23, 1912.
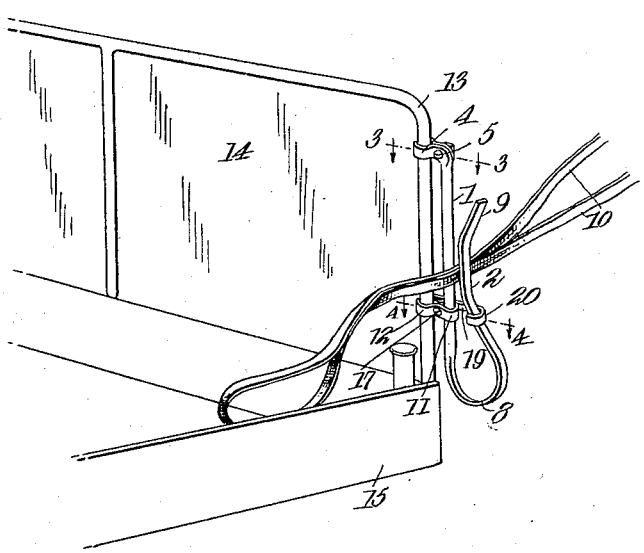
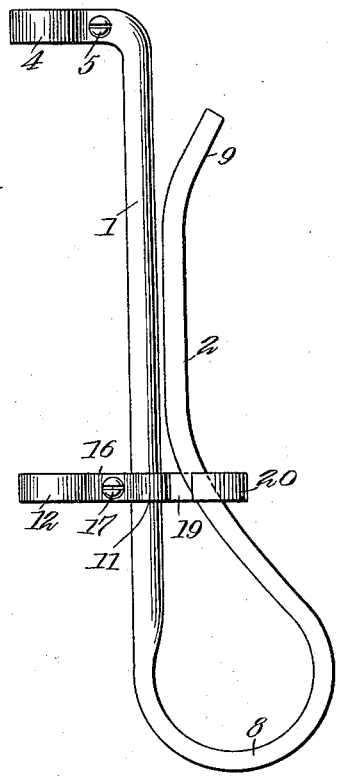
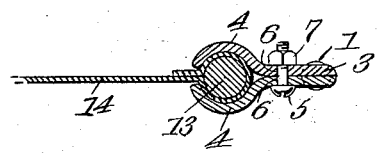
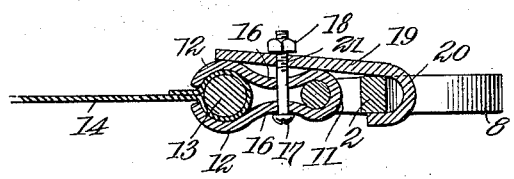
WITNESSES
INVENTOR
GEORGE B. HARLESTON
BY
ATTORNEYS

UNITED STATES PATENT OFFICE.

GEORGE B. HARLESTON, OF STUTTGART, ARKANSAS.

LINE-HOLDER.

1,024,333.	Specification of Letters Patent.	Patented Apr. 23, 1912.

Application filed February 21, 1912. Serial No. 679,110.

*To all whom it may concern:*

Be it known that I, GEORGE B. HARLESTON, a citizen of the United States, and a resident of Stuttgart, in the county of Arkansas and State of Arkansas, have invented certain Improvements in Line-Holders, of which the following is a specification.

My invention is an improvement in line holders, and has for its object, the provision of a simple, inexpensive device of the character specified, for attachment to the dashboard of a vehicle, so arranged as to permit the lines to be easily engaged and disengaged, and which will grasp the lines with sufficient firmness to prevent their accidental dislodgement.

In the drawings: Figure 1 is a perspective view of the improvement in place on a vehicle; Fig. 2 is a front view of the same; and, Figs. 3 and 4 are sections on the lines 3—3 and 4—4 of Fig. 1.

The present embodiment of the invention is formed from a rod or bar of metal of suitable cross section, bent to form a body 1, provided at its upper end with a laterally extending split bearing, and at the other end with a return portion 2, forming with the body a clamp or holder for the lines.

The bearing is formed by bending the rod or bar laterally, and splitting the laterally bent portion as indicated at 3 in Fig. 3, and arching or curving outwardly the portions of the bar on each side of the split to form the sections 4 of the bearing.

A screw bolt 5 is passed through registering openings 6 in the portions of the rod on each side of the split, and the bolt is engaged by a nut 7, to clamp the sections of the bearing together.

The lower end of the rod is flattened, and bent backward or rather upward alongside the body of the bar, to form the return portion 2 of the clamp.

The connection 8 between the body and the return portion is in the form of a loop, which is sufficiently resilient to permit the portion 2 to resume its original position, when moved away from the body of the bar. The extremity of the return portion 2 is bent outwardly at an angle to the body, as shown at 9, to act as a guide for guiding the lines 10 between the portions 1 and 2 of the holder.

A clamp is supported by the body and the portion 2, intermediate the loop 8 and the bearing at the upper end of the bar. The said clamp is formed by doubling a strip upon itself to form a bearing 11 for engaging the body portion 1, and a split bearing having sections 12 for engaging the frame 13 of the dashboard 14, of the vehicle 15.

The strip is bent inwardly, on each side, between the bearings 11 and 12, as shown at 16, to prevent disengagement of the clamp, and a screw bolt 17 is passed through registering openings in the sides of the clamp between the bearings, and is engaged by a nut 18 to clamp the bearing 12 on the frame.

A plate 19 is arranged alongside one side of the clamp just described, and is provided at the end adjacent to the portion 2 of the holder, with a hook 20 for engaging the said portion. The plate is provided with an opening 21 for receiving the bolt 17, and is held in place by the nut 18.

In the use of the holder, it is secured to the frame 13 of the dashboard, by means of the split bearing 4, and the bearing 12 of the clamp. The bearing is secured on the frame by means of the bolt 5 and nut 6, and the clamp by means of the bolt 17 and nut 18. The plate 19 limits the movement of the return portion 2 away from the body, and also prevents the lines from slipping into the loop.

The holder is secured at the right of the dashboard, adjacent to the driver, and in such position that the lines may be easily engaged between the portions 1 and 2 of the holder. The hook 20 insures a firm grip of the holder on the lines.

The holder is simple in construction, easily applied or removed, and the lines are held with sufficient firmness to prevent accidental dislodgment of the lines.

I claim:

1. A device of the character specified, comprising a body having at its upper end a split bearing extending laterally from the body for engaging the frame of a dashboard, the body having its lower end bent backward and lying alongside the body to form with the body a clamp for grasping the lines, the split bearing being formed by splitting the body and bending the portions thereof on each side of the split outwardly to engage the frame between the said portions, said portions having registering openings, a bolt passing through the openings, and a nut engaging the bolt, a clamp on the body between the split bearing and the connection of the body and return portion for engaging the frame, said clamp comprising a bearing for the body and a connected split bearing for the frame, means for clamping the split bearing on the frame, and a plate secured to the clamp by the said means and having a hook for engaging the return bent portion.

2. A device of the character specified, comprising a body having at its upper end a split bearing extending laterally from the body for engaging the frame of a dashboard, the body having its lower end bent backward and lying alongside the body to form with the body a clamp for grasping the lines, the split bearing being formed by splitting the body and bending the portions thereof on each side of the split outwardly to engage the frame between the said portions, said portions having registering openings, a bolt passing through the openings, and a nut engaging the bolt, a clamp on the body between the split bearing and the connection of the body and return portion for engaging the frame, and a plate secured to the clamp and having a hook for engaging the return bent portion, the extremity of the said portion being inclined outwardly from the body.

3. A device of the character specified, comprising a body having at its upper end a split bearing extending laterally from the body for engaging the frame of a dashboard, the body having its lower end bent backward and lying alongside the body to form with the body a clamp for grasping the lines, means for clamping the bearing on the frame, a clamp for connecting the body to the frame arranged near the lower end of the body, a plate secured to the body at the clamp and having a hook for engaging the return bent portion, the extremity of the said portion being inclined outwardly from the body.

4. A device of the character specified, comprising a body having at its upper end a split bearing extending laterally from the body for engaging the frame of a dashboard, the body having its lower end bent backward and lying alongside the body to form with the body a clamp for grasping the lines, means near the lower end of the body for engaging the frame, and means intermediate the ends of the body for engaging the body and the return bent portion, the extremity of the said portion being inclined outwardly away from the body.

5. A device of the character specified, comprising a body having at its upper end a split bearing extending laterally from the body for engaging the frame of a dashboard, the body having its lower end bent backward and lying alongside the body to form with the body a clamp for grasping the lines, the split bearing being formed by splitting the body and bending the portions thereof on each side of the split outwardly to engage the frame between the said portions, said portions having registering openings, a bolt passing through the openings, and a nut engaging the bolt, and a clamp on the body between the split bearing and the connection of the body and return portion for engaging the frame.

GEORGE B. HARLESTON.

Witnesses:
ROBT. E. HOLT,
JOHN L. INGRAM.